3,465,052
STABILIZED CHLOROFLUOROALKANE COMPOSITIONS

Kazuo Okamura, Itami-shi, Japan, assignor to Daikin Kogyo Kabushiki Kaisha, Osaka-shi, Japan
No Drawing. Filed June 13, 1967, Ser. No. 645,635
Claims priority, application Japan, June 15, 1966, 41/38,987
Int. Cl. C07c 17/40
U.S. Cl. 260—652.5                              4 Claims

ABSTRACT OF THE DISCLOSURE

Chlorofluoroalkane compositions resistant to reaction between chlorofluoroalkanes and amine-based polyols, which contain, as an inhibitor to said reaction, p-isopropenyl toluene in an amount ranging from 0.1 to 5 weight percent, based on the weight of the chlorofluoroalkane. Said composition is useful for the production of urethane foams in which chlorofluoroalkanes are brought into contact with amine-based polyols.

---

This invention relates to chlorofluoroalkane compositions and particularly chlorofluoroalkane compositions containing minor proportions of a compound which inhibits the reaction of the chlorofluoroalkane and amine-based polyols.

It is well-known in the art that urethane polymers are produced by the reaction of polyols with polyfunctional isocyanates. If foamed polymers are desired, a chlorofluoroalkane, such as trichlorofluoromethane or trichlorotrifluoroethane, is added as a blowing agent to the polyols or the isocyanates or the mixture of both, and by the vaporization of the blowing agent urethane foams of low density are produced. In such process there are used two types of polyols, i.e., non-amine polyols and amine-based polyols. The former comprises carbon, hydrogen and oxygen, and the latter comprises nitrogen in addition to the above three elements.

In general the non-amine polyols are not reacted with chlorofluoroalkanes under normal temperature, so that the mixture thereof can be stored for a relatively long period without deterioration. When the chlorofluoroalkane blowing agents are added to the amine-based polyols, however, during storage of the mixture a reaction between the polyols and chlorofluoroalkanes occurs to form the undesired products, e.g., an aldehyde, hydrogen chloride and a reduced haloalkane. Such products lead to darkening of the solution, increased viscosity and the production of urethane foams having poor properties.

One object of the invention is to provide inhibitors which effectively inhibit the reaction between chlorofluoroalkanes and amine-based polyols.

Another object of the invention is to provide chlorofluoroalkane compositions which are resistant to amine-based polyols and can be stored in mixture with such polyols for a long period without deterioration.

The above and other objects of the invention will be apparent from the following description.

According to the present invention, a chlorofluoroalkane composition resistant to reaction with amine-based polyols comprises at least one chlorofluoroalkane of the group consisting of trichlorofluoromethane and trichlorotrifluoroethane and 0.1 to 5.0 weight percent of p-isopropenyl toluene

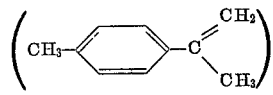

It has been found that when the present chlorofluoroalkane compositions containing p-isopropenyl toluene are brought into contact with amine-based polyols, the reaction between the chlorofluoroalkanes and the polyols is effectively inhibited for a long period under ordinary storage conditions. This inhibiting effect is specific to the p-isopropenyl toluene, and analogous toluene derivatives, such as p-allyl toluene,

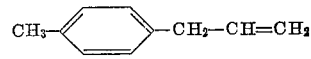

as well as ordinary stabilizers for chloroalkanes, such as hydroquinone, have little or no effect as inhibitors of the reaction between the chlorofluoroalkanes and the amine-based polyols and are not useful for the purpose of the invention.

The p-isopropenyl toluene used in the invention is non-acidic, colorless, substantially non-toxic and low in cost, and easily manufactured by known methods, for example, by dehydrogenation of p-cymene obtained extensively as a byproduct in pulp industries.

The amine-based polyols are usually addition products of alkylene polyamines, such as ethylene diamine, diethylene triamine, propylene triamine, etc., with alkylene oxides, such as ethylene oxide, propylene oxide, etc. Typical examples of the amine-based polyols are N,N,N',N'-tetrakis-2-hydroxyethyl-ethylenediamine,
N,N,N'-tris-2-hydroxypropyl-N'-2-hydroxyethyl-ethylenediamine,
N,N,N',N'-tetrakis-2-hydroxypropyl-ethylenediamine and
N,N,N',N'',N''-pentakis-2-hydroxypropyl-diethylenetriamine.

The chlorofluoroalkanes used in the invention are trichlorofluoromethane and trichlorotrifluoroethane and mixture thereof.

In the invention p-isopropenyl toluene is employed in amounts ranging from 0.1 to 5 percent, preferably 0.2 to 1.0 percent, based on the weight of the chlorofluoroalkane. Lesser amounts thereof are less effective. Larger amounts of the p-isopropenyl toluene may be used, but produce no further advantage and tend to be uneconomical.

The p-isopropenyl toluene is soluble in the chlorofluoroalkanes and the amine-based polyols, and the chlorofluoroalkanes and the polyols also are soluble in each other. The p-isopropenyl toluene can be added to the chlorofluoroalkane, or to the polyols, or to compositions containing both the chlorofluoroalkane and the polyols.

For a better understanding of the invention, the examples of the invention are tabulated in Table 1 below. In the table the results of tests performed to demonstrate the inhibiting effect of p-isopropenyl toluene are shown.

In individual 400 ml. tin-plated pressure containers there were placed the individual sample mixtures of 90 grams of the chlorofluoroalkane and 210 grams of the amine-based polyol specified in the table, to which a prescribed amount of the inhibitor as shown in the table was added, then the mixtures were stirred thoroughly to prepare the original solutions and then the containers were sealed airtight. The mixtures in the containers thus prepared were left for 4 weeks in an air oven maintained at 50° C., after which the viscosity and color changes of the solutions were examined. Viscosity was measured at 25° C. by using a "Brookfield Viscometer" manufactured by Tokyo Keiki Seizosho Co., Ltd., Japan, and color by the Gardner method. In Table 1 the results of the original solutions and control samples are also given. The viscosities are reported in centipoise.

What I claim is:

1. A chlorofluoroalkane composition resistant to reaction with amine-based polyols which comprises at least one chlorofluoroalkane of the group consisting of trichlorofluoromethane and trichlorotrifluoroethane and 0.1 to 5 weight percent of p-isopropenyl toluene, based on the weight of the chlorofluoroalkane.

2. The composition of claim 1 in which said p-isopropenyl toluene is present in amounts ranging from 0.2 to 2 weight percent.

3. The composition of claim 1 in which said chlorofluoroalkane is trichlorofluoromethane.

4. The composition of claim 1 in which said chlorofluoroalkane is trichlorotrifluoroethane.

TABLE 1

| Sample No. | Chlorofluoroalkane | Amine-based polyol | Inhibitor | Amount (percent) | Viscosity (at 25°C.) Original soln. | Viscosity After 4 weeks at 50° C. | Color Original soln. | Color After 4 weeks at 50° C. |
|---|---|---|---|---|---|---|---|---|
| 1-a | $CCl_3F$ | N,N,N',N'',N''-pentakis-2-hydroxypropyl-diethylenetriamine | p-Isopropenyl toluene | 0.05 | 830 | 2,400 | G-1 | >G-18 |
| 1-b | $CCl_3F$ | do | do | 0.08 | 820 | 1,750 | G-1 | >G-18 |
| 1-c | $CCl_3F$ | do | do | 0.1 | 820 | 1,380 | G-1 | G-18 |
| 1-d | $CCl_3F$ | do | do | 0.3 | 810 | 960 | G-1 | G-14 |
| 1-e | $CCl_3F$ | do | do | 0.5 | 820 | 900 | G-1 | G-13 |
| 1-f | $CCl_3F$ | do | do | 1 | 830 | 870 | G-1 | G-12 |
| 1-g | $CCl_3F$ | do | do | 2 | 810 | 850 | G-1 | G-12 |
| 1-h | $CCl_3F$ | do | do | 3 | 820 | 840 | G-1 | G-12 |
| 1-i | $CCl_3F$ | do | do | 5 | 830 | 840 | G-1 | G-12 |
| 1-j | $CCl_3F$ | do | do | 7 | 820 | 850 | G-1 | G-12 |
| Control | $CCl_3F$ | do | do | 0 | 810 | 4,500 | G-1 | >G-18 |
| 2-a | $C_2Cl_3F_3$ | N,N,N',N'-tetrakis-2-hydroxypropyl-ethylenediamine | p-Isopropenyl toluene | 0.05 | 520 | 1,500 | G-1 | >G-18 |
| 2-b | $C_2Cl_3F_3$ | do | do | 0.08 | 540 | 1,300 | G-1 | >G-18 |
| 2-c | $C_2Cl_3F_3$ | do | do | 0.1 | 520 | 1,020 | G-1 | G-17 |
| 2-d | $C_2Cl_3F_3$ | do | do | 0.3 | 530 | 650 | G-1 | G-12 |
| 2-e | $C_2Cl_3F_3$ | do | do | 0.5 | 540 | 600 | G-1 | G-11 |
| 2-f | $C_2Cl_3F_3$ | do | do | 1 | 520 | 610 | G-1 | G-10 |
| 2-g | $C_2Cl_3F_3$ | do | do | 2 | 530 | 590 | G-1 | G-10 |
| 2-h | $C_2Cl_3F_3$ | do | do | 3 | 530 | 600 | G-1 | G-10 |
| 2-i | $C_2Cl_3F_3$ | do | do | 5 | 540 | 580 | G-1 | G-10 |
| 2-j | $C_2Cl_3F_3$ | do | do | 7 | 530 | 600 | G-1 | G-10 |
| Control | $C_2Cl_3F_3$ | do | do | 0 | 530 | 2,900 | G-1 | >G-18 |
| 3-a | $CCl_3F$ | N,N,N',N'-tetrakis-2-hydroxyethyl-ethylenediamine | p-Isopropenyl toluene | 0.05 | 550 | 2,400 | G-1 | >G-18 |
| 3-b | $CCl_3F$ | do | do | 0.08 | 540 | 1,300 | G-1 | G-17 |
| 3-c | $CCl_3F$ | do | do | 0.1 | 560 | 930 | G-1 | G-15 |
| 3-d | $CCl_3F$ | do | do | 0.3 | 550 | 610 | G-1 | G-10 |
| 3-e | $CCl_3F$ | do | do | 0.5 | 540 | 590 | G-1 | G-9 |
| 3-f | $CCl_3F$ | do | do | 1 | 550 | 570 | G-1 | G-9 |
| 3-g | $CCl_3F$ | do | do | 2 | 550 | 590 | G-1 | G-8 |
| 3-h | $CCl_3F$ | do | do | 3 | 530 | 580 | G-1 | G-8 |
| 3-i | $CCl_3F$ | do | do | 5 | 540 | 580 | G-1 | G-8 |
| 3-j | $CCl_3F$ | do | do | 7 | 540 | 570 | G-1 | G-8 |
| Control | $CCl_3F$ | do | | 0 | 550 | 3,000 | G-1 | >G-18 |
| 4-a | $CCl_3F$ | N,N,N',N'-tetrakis-2-hydroxypropyl-ethylenediamine | p-Isopropenyl toluene | 0.05 | 540 | 2,400 | G-1 | >G-18 |
| 4-b | $CCl_3F$ | do | do | 0.08 | 530 | 1,300 | G-1 | >G-18 |
| 4-c | $CCl_3F$ | do | do | 0.1 | 520 | 1,030 | G-1 | G-18 |
| 4-d | $CCl_3F$ | do | do | 0.3 | 530 | 640 | G-1 | G-12 |
| 4-e | $CCl_3F$ | do | do | 0.5 | 550 | 600 | G-1 | G-11 |
| 4-f | $CCl_3F$ | do | do | 1 | 540 | 580 | G-1 | G-10 |
| 4-g | $CCl_3F$ | do | do | 2 | 540 | 590 | G-1 | G-10 |
| 4-h | $CCl_3F$ | do | do | 3 | 530 | 590 | G-1 | G-10 |
| 4-i | $CCl_3F$ | do | do | 5 | 530 | 580 | G-1 | G-10 |
| 4-j | $CCl_3F$ | do | do | 7 | 550 | 590 | G-1 | G-10 |
| Control | $CCl_3F$ | do | do | 0 | 520 | 3,200 | G-1 | >G-18 |
| 5-a | $CCl_3F$ | do | hydroquinone | 1 | 530 | 3,200 | G-1 | >G-18 |
| 5-b | $CCl_3F$ | do | do | 5 | 520 | 3,100 | G-1 | >G-18 |
| 6-a | $CCl_3F$ | do | p-Allyl toluene | 1 | 530 | 3,300 | G-1 | >G-18 |
| 6-b | $CCl_3F$ | do | do | 5 | 520 | 3,200 | G-1 | >G-18 |

References Cited

FOREIGN PATENTS 1,018,809   2/1966   Great Britain.

LEON ZITVER, Primary Examiner

M. JACOB, Assistant Examiner

U.S. Cl. X.R.

260—2.5